Dec. 10, 1968 A. B. VANE 3,416,099

BULK-EFFECT NEGATIVE-RESISTANCE MICROWAVE DEVICE EMPLOYING A HALF WAVE OPEN CIRCUIT RESONATOR STRUCTURE

Filed May 26, 1967

INVENTOR.
ARTHUR B. VANE

BY Wm J Nolan
ATTORNEY

United States Patent Office 3,416,099
Patented Dec. 10, 1968

3,416,099

BULK-EFFECT NEGATIVE-RESISTANCE MICROWAVE DEVICE EMPLOYING A HALF WAVE OPEN CIRCUIT RESONATOR STRUCTURE

Arthur B. Vane, Menlo Park, Calif., assignor to Varian Associates, Palo Alto, Calif., a corporation of California Filed May 26, 1967, Ser. No. 641,536
9 Claims. (Cl. 331—107)

ABSTRACT OF THE DISCLOSURE

A bulk-effect negative-resistance microwave device is disclosed. The bulk-effect device is coupled to the fields of a half wave resonator structure for producing output microwave power at or near the frequency of the resonator. The resonator structure is open circuited at its ends to provide a microwave voltage null near the center thereof.

The bulk-effect device is connected in shunt with the resonator at a low microwave voltage point near its central region. Also a D.C. bias lead having high series impedance to microwaves is connected to the half wave resonator at the microwave voltage null to minimize microwave coupling to the source of bias voltage.

A second similar half wave resonator is inductively coupled to the first resonator for coupling output microwave energy to a load. The two resonators are contained in a housing and in one embodiment an inductive coupling is provided therebetween. Relatively high microwave impedance capacitors are connected across the open circuited ends of the half wave resonators for physically shortening the resonator structure, for lowering the surge impedance $\sqrt{L/C}$, for holding off the D.C. bias voltage and for tuning. In addition, the capacitors are employed for physical support of the resonant structure.

*Description of the prior art*

Heretofore, quarter wave resonant line microwave circuits have been built for use with bulk-effect negative-resistance semiconductive devices to generate microwave power. Such a circuit is described in an article titled, "High-Peak-Power Gallium Arsenide Oscillators," appearing at pages 105–110 of the January 1966 issue of IEEE Transactions on Electron Devices, vol. ED–13, No. 1. In this circuit, the bulk-effect device is placed at a low microwave voltage point across the resonant line for matching the low impedance of the bulk-effect device to the resonator. However, as the requirement for greater microwave output power is raised, the impedance of the bulk-effect device is reduced, especially for Gunn effect devices operating in the transit time mode. As the impedance of the device is reduced it becomes impractical to match the device to the quarter wave resonator since the device cannot be positioned close enough to the low impedance (microwave voltage null) position. Therefore, other suitable circuits must be sought.

*Summary of the present invention*

The principal object of the present invention is the provision of an improved microwave circuit for bulk-effect negative-resistance devices.

One feature of the present invention is the provision, in a bulk-effect negative-resistance microwave apparatus, of a half wave resonant section of line open circuited at its ends with the bulk-effect device connected across the line at a central region thereof near its microwave voltage null position, whereby improved impedance matching to a low impedance high power bulk-effect semiconductive device is obtained.

Another feature of the present invention is the same as the preceding feature wherein lumped capacitors are provided at the ends of the resonant section of line for physically shortening the structure, for isolating the resonant line for D.C. bias potential, and to facilitate tuning thereof. In addition, the shortened capacity loaded structure reduces the surge impedance, $Xo=\sqrt{L/C}$, thereby decreasing certain transient voltage spikes which occur when the microwave oscillations start and which are known to adversely affect the life of bulk effect negative resistance devices.

Another feature of the present invention is the same as any one or more of the preceding including the provision of a bias lead for applying the bias potential to the bulk-effect device, such lead being connected to the resonant section of line at the microwave voltage null position for reducing the coupling of microwave energy into the bias network.

Another feature of the present invention is the same as any one or more of the preceding features including the provision of a second similar half wave open circuited section of line coupled to the first for coupling output microwave energy to a load, whereby high frequency components of the pulsed bias potential as applied to the semiconductive device are not coupled to the load and whereby second harmonic output of the device may be suppressed.

Another feature of the present invention is the same as the preceding feature including the provision of a conductive housing containing the two resonant line circuits with an inductive coupling iris disposed therebetween for controlling the microwave coupling between the two circuits.

Other features and advantages of the present invention will become apparent upon a persual of the following specification taken in connection with the accompanying drawings wherein:

*Description of the preferred embodiments*

Figure 1:
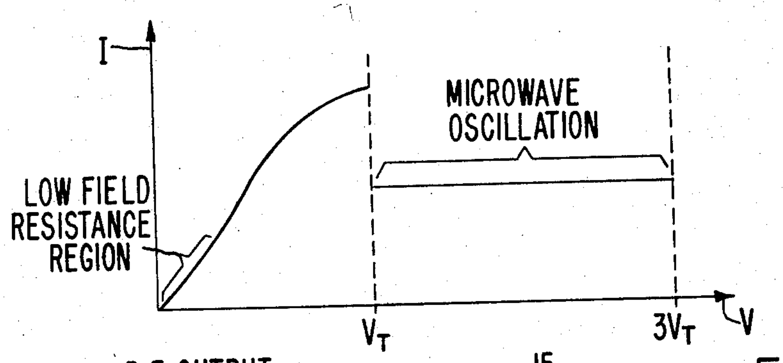
FIG. 1 is a plot of D.C. current I versus D.C. bias voltage V for a typical bulk-effect negative-resistance semiconductive device to be employed in the circuits of the present invention.

Referring now to FIG. 1, there is shown the D.C. current I versus D.C. bias voltage V characteristics for a typical bulk-effect negative-resistance semiconductive device. As the voltage V is increased, the current increases until a certain threshold voltage $V_T$ is applied. At $V_T$ the current drops and remains nearly constant with increasing voltage. Concurrent with the drop in current the device breaks into microwave oscillations, thereby converting D.C. power into microwave power. The oscillations are associated with bulk-effect negative-resistance of the semiconductive device. As used herein, "bulk-effect negative-resistance devices," are defined to mean devices which convert D.C. power into microwave power due to mechanisms related to the bulk properties of the semiconductive device, as contrasted with other types of negative-resistance devices which convert D.C. power into microwave power predominantly due to properties of a p-n junction. Such junction devices are typified by tunnel diodes, whereas, bulk-effect devices are typified by Gunn devices. Bulk effect devices are capable of providing higher output power because the power is dissipated in the bulk of the material rather than in the thin junction.

Gunn devices may be operated in either the transit time mode or the limited space charge accumulation mode. In the transit time mode, Gunn devices exhibit a characteristic operating microwave frequency determined largely by the thickness of the semiconductive wafer, typically, GaAs. In the limited space charge accumulation mode, the operating frequency is independent of wafer thickness and more dependent upon the resonant frequency of the microwave circuit to which it is coupled.

Figure 2:
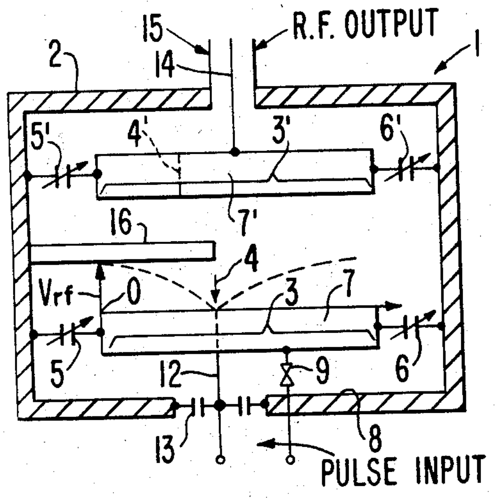
FIG. 2 is a schematic microwave circuit diagram of a microwave oscillator incorporating features of the present invention.
Figure 3:
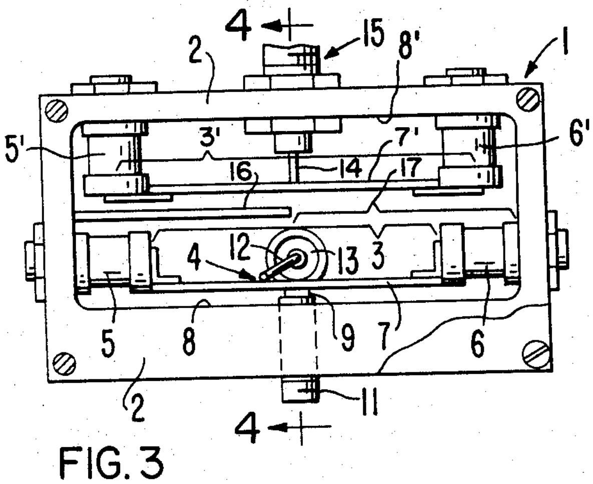
FIG. 3 is a longitudinal sectional view of a microwave oscillator of the present invention.
Figure 4:
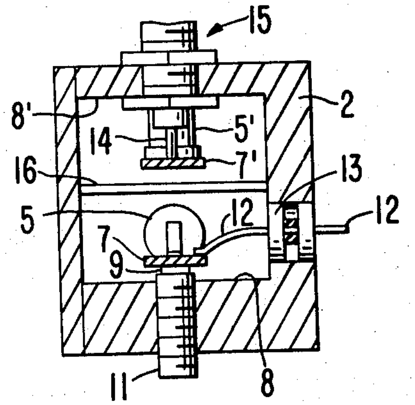
FIG. 4 is a sectional view of the structure of FIG. 3 taken along line 4—4 in the direction of the arrows.

Referring now to FIGS. 2, 3, and 4, there is shown a bulk-effect L-band microwave oscillator 1 incorporating features of the present invention. The oscillator 1 includes a hollow metallic housing 2 containing the microwave circuitry therein. The microwave circuit includes a first half wavelength resonant section of transmission line 3 which is open circuited at its ends to provide a microwave voltage null plane 4 at a centrally located position along the length of the resonant line 3 (see the plot of microwave voltage $V_{rf}$ versus length of the line 3 as indicated by the dotted line superimposed on the schematic diagram of FIG. 2).

A pair of lumped capacitors 5 and 6 are disposed at the ends of the resonant line section 3. As used herein "lumped" is defined to mean that the electrically active length of the member at its operating frequency is less than one quarter of a free space wavelength long. The capacitors 5 and 6 serve to physically support one conductor 7 of the resonant line section above the other conductor 8, which is a ground plane formed by an inside wall of the housing 2. In addition, the capacitors 5 and 6 serve to provide D.C. isolation for the inner conductor 7 to permit application of a D.C. bias voltage thereto, as more fully described below. Also, the capacitors 5 and 6 capacitively load the resonant section of line 3, thereby shortening its physical length when compared to a half of a free space wavelength and reducing the surge impedance, $\sqrt{L/C}$. Moreover, the capacitors 5 and 6 are made variable for changing the resonant frequency of the resonant section of line 3 and for shifting the position 4 of the microwave voltage null along the length of the inner conductor 7, as desired for impedance matching, more fully described below.

A bulk-effect negative-resistance device 9, such as a transit time mode Gunn device, is connected across the resonant section of line 3 near the voltage null position 4. The bulk-effect device 9 has a relatively low impedance for microwave energy as of, for example, 6Ω and is placed near to the voltage null position 4 for impedance matching the device 9 to the resonant line 3. The device 9 has one terminal soldered to the end of a conductive stud 11 as of copper which is screwed through a tapped hole in the housing. The stud 11 is screwed into the housing far enough to produce a good electrical connection between the other terminal of the device 9 and the inner conductor 7.

A D.C. bias potential, as of $2V_T$ volts, which is pulsed at a repetition rate of 1000 pulses per second of 150 nanoseconds duration with rise times of 30 nanoseconds, is applied across the bulk-effect device 9. The bias voltage with respect to the grounded housing is fed onto the inner conductor 7 from a pulsed source, not shown, via lead 12. Lead 12 is bypassed for microwaves to the housing 2 via a pair of feedthrough bypass capacitors 13. Inside the housing 2, lead 12 is relatively small in diameter to provide substantial series inductance to microwave energy and, in addition, provides a relatively small distributed capacitance to the ground plane 8 such that it has a much higher characteristic impedance than that of the section of resonant line 3 to which it is affixed. Moreover, lead 12 is connected to the inner conductor 7 substantially at the microwave voltage null point 4 in order to further reduce microwave energy coupling to the bias circuit. Microwave coupling to the bias circuit can produce unwanted sidebands on the output microwave signal.

A second half wavelength section of resonant transmission line 3' is disposed within the housing 2 along a mutually opposed inner side wall 8' thereof. This second resonant line 3' forms a resonant output circuit and is essentially identical to the first resonant line 3. Primed reference numerals have been employed to denote similar parts in the second resonant section of line 3'. A center conductor 14 of a coaxial output line 15 is connected to the central region of the inner conductor 7' of the output resonant line 3' for coupling microwave energy to a load, not shown. A conductive septum 16 extends across the housing 2 in between the two resonant line sections 3 and 3'. The septum 16 extends only about half of the length of the two resonators 3 and 3' to define an inductive coupling iris 17 which provides inductive microwave coupling between the two resonators 3 and 3'.

At L-band, the resonant sections of line 3 and 3' are conveniently formed by lengths of flat conductor 7 and 7' disposed over a ground plane 8 and 8', respectively. The spacing between strip 7 and ground plane 8, typically ⅛ inch, is chosen to optimize the inductance of stud 11 which is in series with the bulk-effect device 9. The strip conductor 7 is dimensioned to provide a characteristic impedance $Z_0$ of 50 to 100Ω.

In operation, the pulsed bias voltage is applied to the bulk-effect device 9. The device 9 breaks into oscillation at the resonant frequency of the section of resonant line 3. Output microwave power is coupled from the output resonator 3' and fed to a suitable utilization device or load, not shown, via output line 15. Capacitors 5 and 6 may be adjusted for tuning the frequency of the oscillator 1 and for adjusting the impedance match to the bulk-effect device 9. The output coupling can be varied and impedance matched by adjusting the capacitance of capacitors 5' and 6'. Changing the tuning of the output resonator 3' also permits suppression of the second harmonic output of the oscillator 1. One additional advantage of the provision of the second or output resonator 3' is that it provides decoupling of the output from the pulsed bias source. At 1 gHz., the pulsed bias signal contains substantial Fourier components at 100 mHz. These 100 mHz. components could be coupled to the load if it were not for the second resonant circuit 3' which is only inductively coupled to the first resonator 3.

Figure 5:
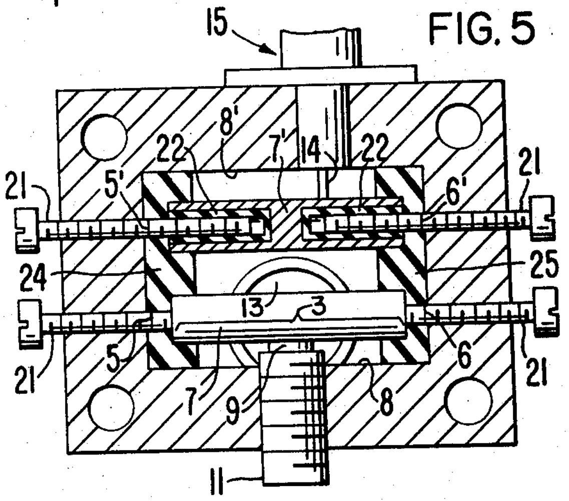
FIG. 5 is a longitudinal sectional view similar to that of FIG. 3 depicting an alternative embodiment of the present invention.

Referring now to FIG. 5, there is shown an alternative embodiment of the present invention. In this embodiment, the operating frequency of the oscillator 1 is 4 gHz. The oscillator 1 is essentially identical to that of FIGS. 2–4 except that the septum 16 has been eliminated and the capacitors 5, 5', 6 and 6' are formed by screws 21 threaded into dielectric sleeves 22 inserted within the hollow ends of inner conductors 7 and 7' to form variable coaxial capacitors. The inner conductors 7 and 7' are rods of either circular or square cross section and are supported at their ends via bores in a pair of dielectric slabs 24 and 25 positioned at the end of the housing 2.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a bulk-effect negative-resistance microwave apparatus, means forming a microwave resonant structure, means forming a bulk-effect negative-resistance semiconductive device coupled to the fields of said resonator for electromagnetic interaction therewith to produce an output microwave signal, the improvement wherein, said microwave resonant circuit is a half wavelength resonant section of transmission line open circuited at its ends to define a microwave voltage null point on said line intermediate the ends thereof, and wherein said bulk-effect device is connected across said resonant section of line nearer to said voltage null point than the ends of said resonant section of line for impedance matching the low impedance of said semiconductive device to said resonant section of line.

2. The apparatus of claim 1 including means forming lumped capacitive members disposed at the open circuited ends of said section of resonant line for shortening the physical length thereof and for supporting said resonant section of line in D.C. insulated relation.

3. The apparatus of claim 2 including means for changing the capacity of at least one of said capacitive members for tuning the resonant frequency of said resonant section of line and for shifting the position of said microwave voltage null point.

4. The apparatus of claim 1 including means for applying a D.C. bias voltage across said section of resonant line, and said bias applying means including a conductive lead connected to said resonant section of line approximately at the point of said microwave voltage null to reduce coupling of microwave energy into said bias applying means.

5. The apparatus of claim 1 including means forming a conductive housing containing said resonant section of transmission line, and means forming a second section of half wavelength resonant section of transmission line open circuited at its ends, said second resonant section of line being disposed in said conductive housing in microwave coupled relation to said first section of resonant line for coupling the output microwave signal from said first resonator to a load.

6. The apparatus of claim 5 including means forming an inductive coupling iris disposed in said housing between said first and second resonant sections of line for controlling the amount of microwave coupling between said first and second resonant sections of line.

7. The apparatus of claim 5 including means forming lumped capacitive members disposed at the open circuited ends of said second section of resonant line for shortening the physical length thereof.

8. The apparatus of claim 7 including means for changing the capacity of at least one of said capacitive members at the ends of said second section of resonant line for tuning the resonant frequency of said second resonant section of line.

9. The apparatus of claim 8 including means for coupling the microwave output signal from said second section of resonant line to a load, said output coupling means being connected across said second section of resonant line intermediate its length.

No references cited.

JOHN KOMINSKI, *Primary Examiner.*

U.S. Cl. X.R.

331—96, 97, 101; 333—73